US011081916B2

(12) United States Patent
Bernreuther

(10) Patent No.: US 11,081,916 B2
(45) Date of Patent: Aug. 3, 2021

(54) ROTOR DEVICE FOR AN ELECTRIC MOTOR AND/OR GENERATOR, ROTOR AND MOTOR WITH SUCH A ROTOR DEVICE AS WELL AS PRODUCTION METHOD

(71) Applicant: Bühler Motor GmbH, Nürnberg (DE)

(72) Inventor: Georg Bernreuther, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 0 days.

(21) Appl. No.: 16/381,753

(22) Filed: Apr. 11, 2019

(65) Prior Publication Data
US 2019/0238015 A1 Aug. 1, 2019

Related U.S. Application Data

(60) Division of application No. 15/992,759, filed on May 30, 2018, which is a continuation of application No. PCT/DE2016/200507, filed on Nov. 9, 2016.

(30) Foreign Application Priority Data

Dec. 3, 2015 (DE) ...................... 10 2015 121 102.5

(51) Int. Cl.
*H02K 1/27* (2006.01)
*H02K 29/08* (2006.01)
(Continued)

(52) U.S. Cl.
CPC ............... *H02K 1/276* (2013.01); *H02K 1/28* (2013.01); *H02K 11/215* (2016.01); *H02K 15/03* (2013.01); *H02K 29/08* (2013.01)

(58) Field of Classification Search
CPC ...... H02K 29/08; H02K 1/276; H02K 11/215; H02K 1/28
(Continued)

(56) References Cited

U.S. PATENT DOCUMENTS 4,827,170 A * 5/1989 Kawamura ............. F01D 15/10
290/52
2005/0067917 A1* 3/2005 Kastinger ............. F04D 25/166
310/257
(Continued)

FOREIGN PATENT DOCUMENTS

DE    10 2007 015 249 A1    10/2008
DE    20 2012 103 438 U1     9/2012
(Continued)

OTHER PUBLICATIONS

Kuwate (DE 202012103438 U1) English Translation (Year: 2012).*
(Continued)

*Primary Examiner* — Tulsidas C Patel
*Assistant Examiner* — Robert E Mates
(74) *Attorney, Agent, or Firm* — Westerman, Hattori, Daniels & Adrian, LLP

(57) ABSTRACT

A rotor device for an electric motor and/or generator with a rotor body and a plurality of magnets, wherein the rotor body comprises a rotor shaft seat and a plurality of magnet receptacles arranged coaxially with the rotor shaft seat. The magnets are rigidly positioned and mounted in the magnet receptacles by means of a plastic molding compound injected into the magnet receptacles, which plastic molding compound forms at least one cover element that covers the openings of the magnet receptacles at least partially. The cover element comprises at least one magnet wheel centering means and/or at least one magnet wheel alignment means. The invention furthermore relates to a rotor and a motor with such a rotor device as well as to a production method.

13 Claims, 9 Drawing Sheets

(51) Int. Cl.
*H02K 11/215* (2016.01)
*H02K 1/28* (2006.01)
*H02K 15/03* (2006.01)

(58) Field of Classification Search
USPC .............. 264/272.2; 310/43, 61, 156.08
See application file for complete search history.

(56) References Cited

U.S. PATENT DOCUMENTS

| | | | |
|---|---|---|---|
| 2005/0285468 A1* | 12/2005 | Fukushima | H02K 1/2706 310/156.53 |
| 2007/0138889 A1* | 6/2007 | Maldener | H02K 1/2733 310/156.22 |
| 2011/0095642 A1* | 4/2011 | Enomoto | H01F 3/04 310/216.045 |
| 2013/0042655 A1* | 2/2013 | Matsuo | D06F 37/304 68/139 |
| 2015/0061445 A1 | 3/2015 | Ishimatsu et al. | |
| 2015/0145366 A1* | 5/2015 | Akashi | H02K 1/276 310/156.08 |

FOREIGN PATENT DOCUMENTS

| | | | | |
|---|---|---|---|---|
| DE | 202012103438 U1 * | 9/2012 | | H02K 1/276 |
| EP | 0640838 A1 * | 3/1995 | | G01P 3/487 |
| JP | 2001119876 A * | 4/2001 | | |

OTHER PUBLICATIONS

Takada (JP 2001119876 A) English Translation (Year: 2001).*
Schenk (EP 0640838 A1) English Translation (Year: 1995).*
International Search Report dated Feb. 23, 2017, issued in counterpart International Application No. PCT/DE2016/200507 (2 pages).
Search Report dated Aug. 1, 2016, issued in counterpart German Patent Application No. 10 2015 121 102.5 (7 pages).

* cited by examiner

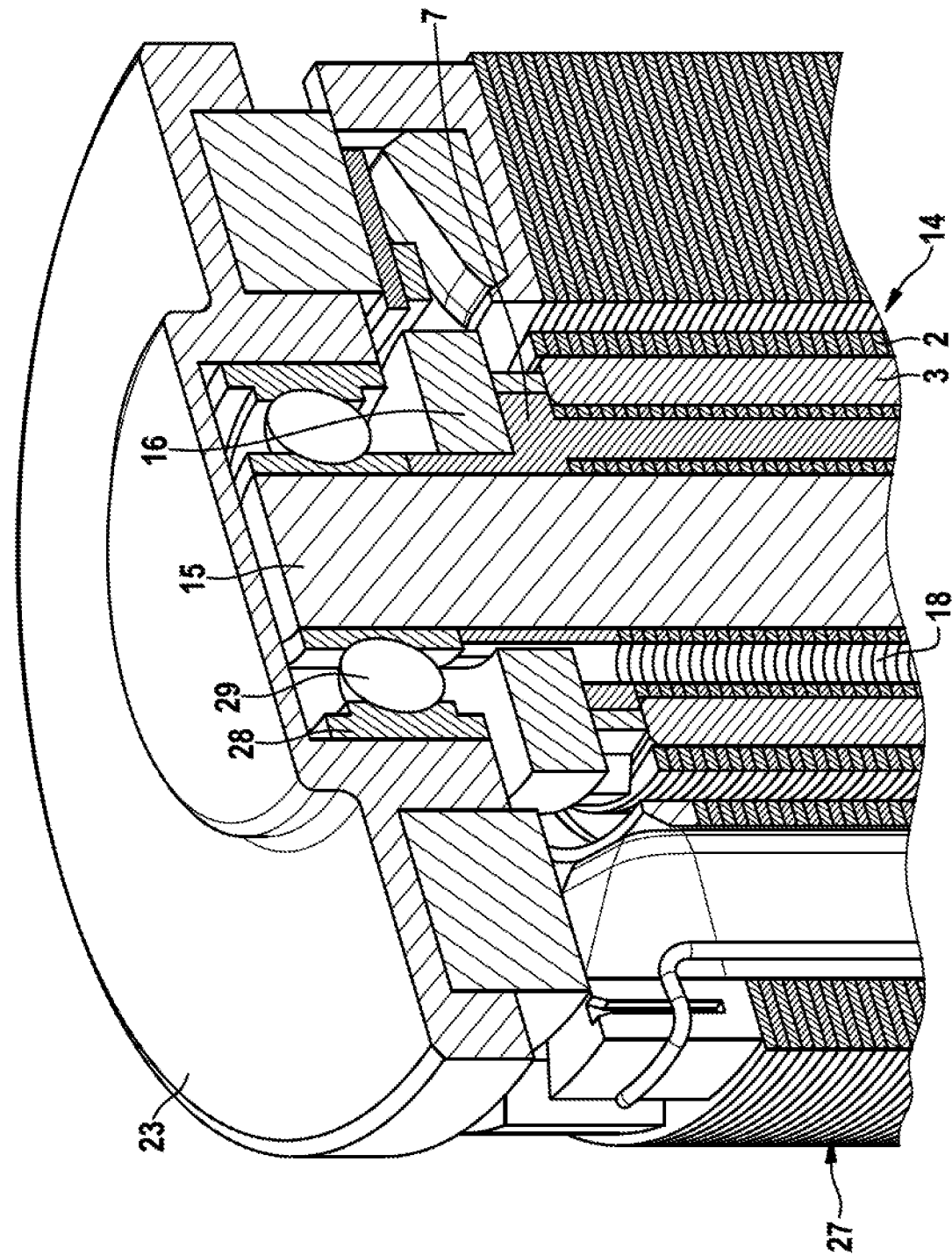

ROTOR DEVICE FOR AN ELECTRIC MOTOR AND/OR GENERATOR, ROTOR AND MOTOR WITH SUCH A ROTOR DEVICE AS WELL AS PRODUCTION METHOD

CROSS-REFERENCE TO RELATED APPLICATIONS

This application is a Divisional of copending U.S. patent application Ser. No. 15/992,759, filed on May 30, 2018, which is a Continuation of International Application No. PCT/DE2016/200507, filed on Nov. 9, 2016, which is based on, and claims priority from, German Application No. DE 10 2015 121 102.5, filed on Dec. 3, 2015, both of which are incorporated herein by reference in their entireties.

BACKGROUND OF THE INVENTION

(1) Field of the Invention

The invention relates to a rotor device for an electric motor and/or generator. The invention furthermore relates to a rotor and a motor with such a rotor device as well as to a production method for such a rotor device.

(2) Description of Related Art Including Information Disclosed Under 37 CFR 1.97 and 1.98

The term "electric motor" refers to an electromagnetic transducer, which converts electrical energy into mechanical energy. In doing so, a physical principle is used, wherein a current-carrying conductor generates a magnetic field and different magnetic fields exert forces on each other. These forces are also called Lorentz forces. An electric motor that can generate a rotational movement generally comprises a rotatable component (also called a rotor) and a stationary or fixed component (also called a stator). Here, separate magnetic fields are generated in each case in the rotor and in the stator, wherein the magnetic fields are generated by at least one of the components by means of one or more current-carrying coils. There is also the possibility of generating one of the magnetic fields by means of permanent magnets or field magnets. The magnets are, for example, inserted into appropriate receiving pockets in a rotor.

A rotor device of the type mentioned is known, for example, from DE 20 2012 103 438 U1. The previously known rotor device comprises a rotor core lamination stack consisting of several rotor core laminations connected to each other axially, wherein the rotor core lamination stack comprises receiving pockets in which permanent magnets are accommodated. The permanent magnets are held in the receiving pockets by a casting material. The receiving pockets or the permanent magnets are covered on one side by a support ring.

In the case of brushless direct-current motors, it is necessary to control the individual developments of a rotor precisely at predefined points in time. For this purpose, the controller needs information about the current alignment of the rotor. This typically takes place via a magnet wheel, which is mounted on the end face of the rotor. In doing so, care must be taken that the magnet wheel is precisely aligned with respect to the rotor so that correct information about the current position of the rotor is transmitted to the controller. In the previously known rotor device according to DE 20 2012 103 438 U1, attaching and aligning a magnet wheel requires additional production steps, which increases the production costs of such rotor devices, especially in the case of series production.

BRIEF SUMMARY OF THE INVENTION

The aim of the invention consists in specifying an improved rotor device, which makes it possible to simply and cost-effectively attach a magnet wheel. It is furthermore the aim of the invention to specify a rotor, a motor with such a rotor device, and also a production method.

The invention is based on the idea of providing a rotor device for an electric motor and/or generator with a rotor body and a plurality of magnets, wherein the rotor body comprises a rotor shaft seat and a plurality of magnet receptacles arranged coaxially with the rotor shaft seat and the magnets are arranged in the magnet receptacles. The magnets are rigidly positioned and mounted in the rotor body, in particular in the magnet receptacles, by means of a plastic molding compound injected into the magnet receptacles, wherein the plastic molding compound forms at least one cover element, which covers the openings of the magnet receptacles at least partially. The cover element comprises at least one magnet wheel centering means and/or at least one magnet wheel alignment means.

The injected plastic results in the advantage of a cost-effective, reliable, and permanent fixing of the block magnets in the rotor core lamination stack. In the process, up to two annular end faces or cover elements can be molded on at the same time, onto which at least one ball bearing can be pressed, that is, using an interference fit. In this case, a molded-on cover element is formed or arranged on one end of the rotor body and another optional cover element is formed or arranged on the other, opposite end of the rotor body. Due to the magnet wheel being molded on, another part can be dispensed with, which supports the rotor or which withstands an interference-fit process onto the motor shaft.

The magnet wheel centering means serves to center a magnet wheel on the rotor shaft. The magnet wheel centering means thus brings about a centered or coaxial alignment of the magnet wheel and avoids imbalances. The magnet wheel centering means also has a stop function, whereby a generally known "stick-slip effect" is avoided and a more precise mounting is made possible as a result of fixing the bearing by an interference fit.

The magnet wheel alignment means serves to align the magnet wheel in order to provide correct commutation. In this way, an angular misalignment of the magnetic poles occurring between the active rotor magnets and the magnet wheel, which can lead to faulty commutation, is prevented. In this case, the rotor position can be determined in many applications by three switching Hall sensors via the alignment of the magnet wheel.

In the prior art, the rotor magnets were often simply lengthened in order to detect the rotor position. These lengthened magnets have the disadvantage that they often consist of rare-earth magnet material and are thus very expensive. On the other hand, this significantly increases the rotor moment of inertia, whereby the accelerating and braking ability is worsened. In order to eliminate these disadvantages, the idea thus suggests itself of mounting a separate magnet wheel consisting of ferrite magnets or plastic-bonded ferrite or rare-earth magnets on the rotor, in particular on the cover element, using the aforementioned means.

In connection with the present invention, it is pointed out that the term "rotor core lamination stack" typically refers to a rotor body with a plurality of metal disks or metal layers, which are arranged together and, lying on top of each other, form the rotor body. The metal disks are mostly electrically insulated from each other using lacquer or laminate in order to suppress eddy currents arising from a changing magnetic field and to thus reduce losses and heat produced by the current.

The magnet wheel centering means is preferably integrally molded onto the cover element as an insulating ring. The insulating ring has the advantage that it can be easily produced at low cost. The insulating ring can in particular be integrally molded on during the formation of the cover element. The magnet wheel centering means is in particular an insert molding around the rotor shaft. It has also been proven advantageous that the insulating ring can preferably serve both as magnet wheel centering means and as magnet wheel alignment means if, for example, the outer surface is designed with alignment elements. This is the case when the insulating ring is not a rotation body but has indentations and/or edges, such as in the case of a hexagon head screw. As a result, a magnet wheel can only be mounted on the insulating ring in a certain alignment.

The magnet wheel alignment means can be integrally molded onto the cover element as at least one pin element. A pin element can be easily produced at low cost and can in particular also be integrally molded on during the formation of the cover element.

In an advantageous embodiment, the cover element has a hole congruent with the rotor shaft seat. This results in the advantage that a sealing arises between the rotor shaft and the cover element when the rotor shaft is inserted.

It has also been proven to be advantageous when the cover element is designed to be disk-shaped and/or annular. As a result of the disk shape, a circular and flat plane is molded on, which does not generate an imbalance and only constitutes a slight additional weight at the rotor. The annular shape has the same advantages as the disk shape and has even less weight.

The cover element preferably comprises a toothed edge, wherein each tooth of the toothed edge is arranged in each case between two magnet receptacles. As a result of the teeth, there is good contact between the cover element and the plastic molding compound injected into the rotor. The mounting of the cover element on the rotor as well as that of the injected plastic molding compound is thus reinforced and improved. Plastic molding compound and thus weight and costs can additionally be saved because of the cavities, recesses or indentations formed between the teeth.

The rotor body is preferably designed in one or more parts, in particular as a rotor core lamination stack, wherein the magnet receptacles fully accommodate the magnets. Iron cores made of solid material as rotor bodies may be less costly but, in generators and machines, in particular in transformers, have the disadvantage that eddy currents arise under the influence of changing magnetic fields. These induced eddy currents result in losses and heat the core with increasing frequency. A multi-part iron core, in particular a laminated core, e.g. for a rotor body, avoids this problem since the parts or laminations are electrically insulated from each other by means of a lacquer or laminate and since no or only minor eddy currents can thus form. As a result of the magnets being fully accommodated in the receptacles, a compact rotor results, in which the magnets are better fixed and mounted by the injected plastic.

Together with a rotor shaft mounted in the rotor shaft seat and a magnet wheel connected to the cover element, the rotor device according to the invention forms a rotor. The present invention also relates to a motor with a rotor device according to the invention, in particular with an aforementioned rotor.

The production method according to the invention for a rotor device, in particular a rotor device according to the invention, was developed to achieve the aforementioned aim and comprises the following steps:
 a) Providing a rotor body with a rotor shaft seat and a plurality of magnet receptacles;
 b) Inserting magnets into the magnet receptacles; and
 c) Injecting a plastic molding compound into the magnet receptacles until a cover element is formed that at least partially covers the openings of the magnet receptacles.

This method has the advantage that the method steps can be implemented easily and thus on a large scale in factories. The fixing and mounting of the magnets in the receptacles by means of the plastic is moreover cost-effective and can be performed quickly.

When injecting a plastic molding compound, the magnets are preferably insert-molded such that the magnets are fixed within the magnet receptacles. In doing so, it is preferably kept in mind that the magnets should not have any play in the receptacles nor be able to get loose or fall out of them. In this way, the magnets can be insert-molded either partially or completely. In the case of a partial insert molding, only the lateral surfaces of the magnets, can, for example, come into contact with the plastic in particular in sections, while the upper and/or lower sides of the magnets are/is completely or partially uncovered. The magnets or the end faces of the rotor are therefore partially uncovered and form corresponding indentations or edges, since these sub-areas are covered by mold parts during injection of the plastic.

In another advantageous embodiment, the inserted magnets are positioned, in particular by means of an injection-molding tool and/or an injection mold, in the magnet receptacles before and/or during injection of a plastic molding compound. The injected plastic can in some circumstances influence the alignment or position of the magnets in the receptacles and tilt the receptacles with respect to the rotor axis, for example. The pre-positioning ensures that the magnets are correctly aligned and fixed in a certain position by means of the plastic. The magnetic or rotating field generated by the magnets is thus formed evenly and uniformly with the exception of its alternating polarity.

It is also advantageous when a magnet wheel centering means and/or a magnet wheel alignment means is preferably molded onto the cover element. A magnet wheel is moreover preferably placed, centered, and/or positioned on the magnet wheel centering means and/or on the magnet wheel alignment means. The magnet wheel is also preferably connected to the magnet wheel centering means and/or the magnet wheel alignment means by ultrasonic welding, hot pressing, and/or gluing.

In another advantageous embodiment, the magnet wheel is directly injected onto the cover element by means of a two-component injection-molding process. As a result, the rotor can be processed further immediately after the formation of the cover element, without taking the rotor out of the injection-molding line. This saves time and costs during the production process.

The injected plastic molding compound in the rotor device according to the invention and in the production method according to the invention can advantageously consist of, contain, or be produced from one or more different liquid-crystal polymers (LCP). In particular as a result of the strongly anisotropic geometry of the LCPs, a strong intermolecular cohesion arises, whereby high melting points are achieved.

In the production of the rotor device, the rotor shaft can be inserted into the rotor body before or after fixing the magnets in the receptacles by means of the plastic and forming the cover element.

The invention, in particular the rotor device according to the invention and the method according to the invention, are suitable in particular for application in BLDC motors, i.e. in brushless direct-current motors. The invention is in particular suitable for application in brushless direct-current motors that are used for driving pumps in oil production but also for pumping other viscous media. A particularly advantageous application results for brushless direct-current motors in oil pumps of motor vehicles.

BRIEF DESCRIPTION OF THE SEVERAL VIEWS OF THE DRAWINGS

The invention is described below with reference to exemplary embodiments, which are explained in more detail with reference to the figures. They show:

FIG. 7 is a cross-section of a BLDC motor with the arrangement of FIG. 6 and a stator;

FIG. 9b is a side view of the rotor of FIG. 9a.

DETAILED DESCRIPTION OF THE INVENTION

Figure 1:
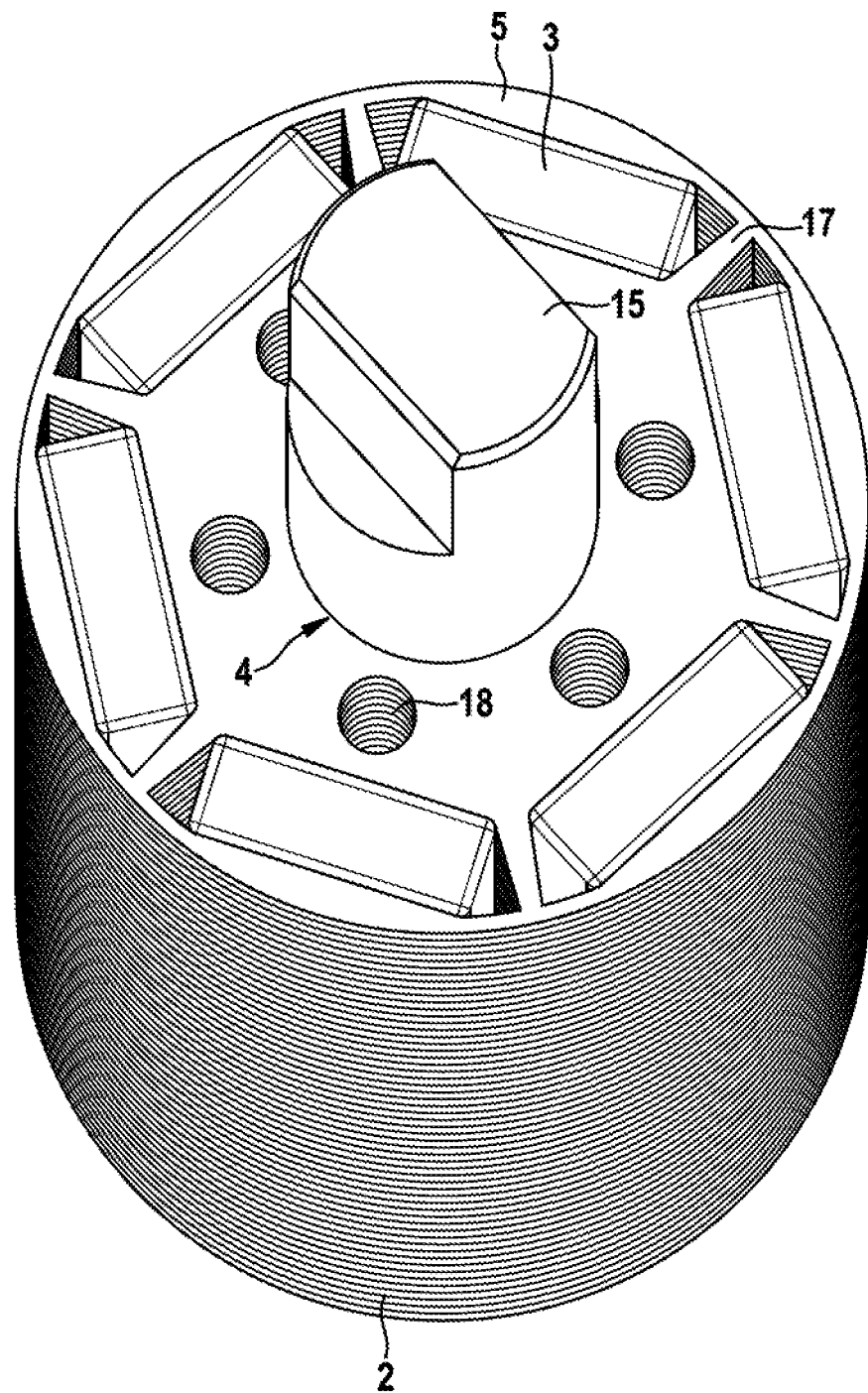
FIG. 1 is a perspective view of a rotor body of the rotor device according to the invention according to a preferred exemplary embodiment with inserted magnets and rotor shaft.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a perspective view of a cylindrical rotor body 2 comprising several disks with six magnets 3 inserted into the magnet receptacles 5 and a rotor shaft 15 inserted into a rotor shaft seat 4. In addition, six holes 18 are formed concentrically about the rotor shaft seat 4 and extend, like the rotor shaft seat 4 and the magnet receptacles 5, from the top end face to the bottom end face of the rotor body 2. The rotor body 2 comprises three planes of symmetry, wherein the common intersecting line of all three planes constitutes a rotor shaft axis. The rotor shaft axis extends centrally in the rotor shaft 15 and constitutes its axis of symmetry or axis of rotation. Each plane of symmetry has an angle of 60° with respect to the adjacent plane of symmetry and extends centrally through two opposite holes 18. The magnets 3 have the shape of a block and have a rectangular cross-section. At the edge of the rotor body 2, the six magnet receptacles 5 substantially form circular sectors with an angle of at most 60°, wherein each sector is delimited by an imaginary chord. Adjacent magnet receptacles 5 are in each case demarcated from each other by a wall 17. A hole 18 is in each case arranged between a magnet receptacle 5 and the rotor shaft seat 4. The holes 18 serve as adjusting and receiving means for an injection-molding tool in order for the plastic to be correctly injected into and onto the rotor body 2.

Figure 2:
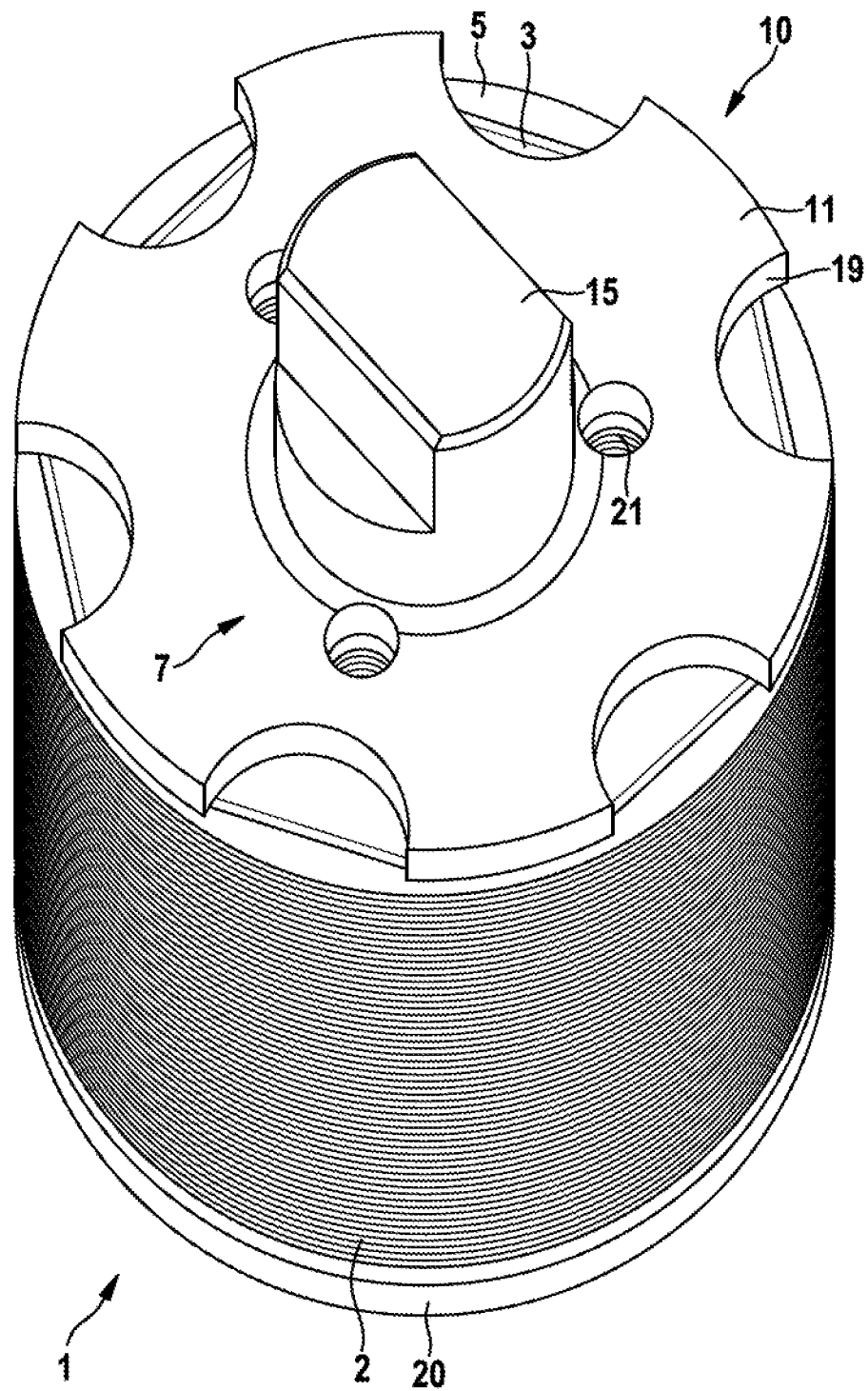
FIG. 2 is a rotor device according to the invention according to a preferred exemplary embodiment with the rotor body according to FIG. 1.

FIG. 2 shows the rotor body 2 of FIG. 1 with an additionally formed cover element 7, in particular as rotor device 1 according to the invention with rotor shaft 15. The cover element 7 is formed in the shape of a disk on the top end face of the rotor body 2 and has, like the rotor body 2, the same three axes or planes of symmetry. Three holes 21 are formed on the cover element 7 concentrically about the rotor axis at a 120° angle to each other and congruently with the three holes of the rotor body 2. The cover element 7 additionally comprises a toothed edge 10 with six teeth 11 and six indentations 19, wherein the teeth 11 are arranged directly above the intermediate walls (17, not visible) of the magnet receptacles 5 and extend to the edge of the rotor body 2. The indentations 19 are in each case formed in the shape of semicircles between two teeth 11, in particular such that a part of the top end face of a magnet 3 is visible. On the bottom end face of the rotor device 1, another cover element 20 is arranged, which is formed from plastic like the first cover element 7 but does not have a toothed edge.

Figure 3:
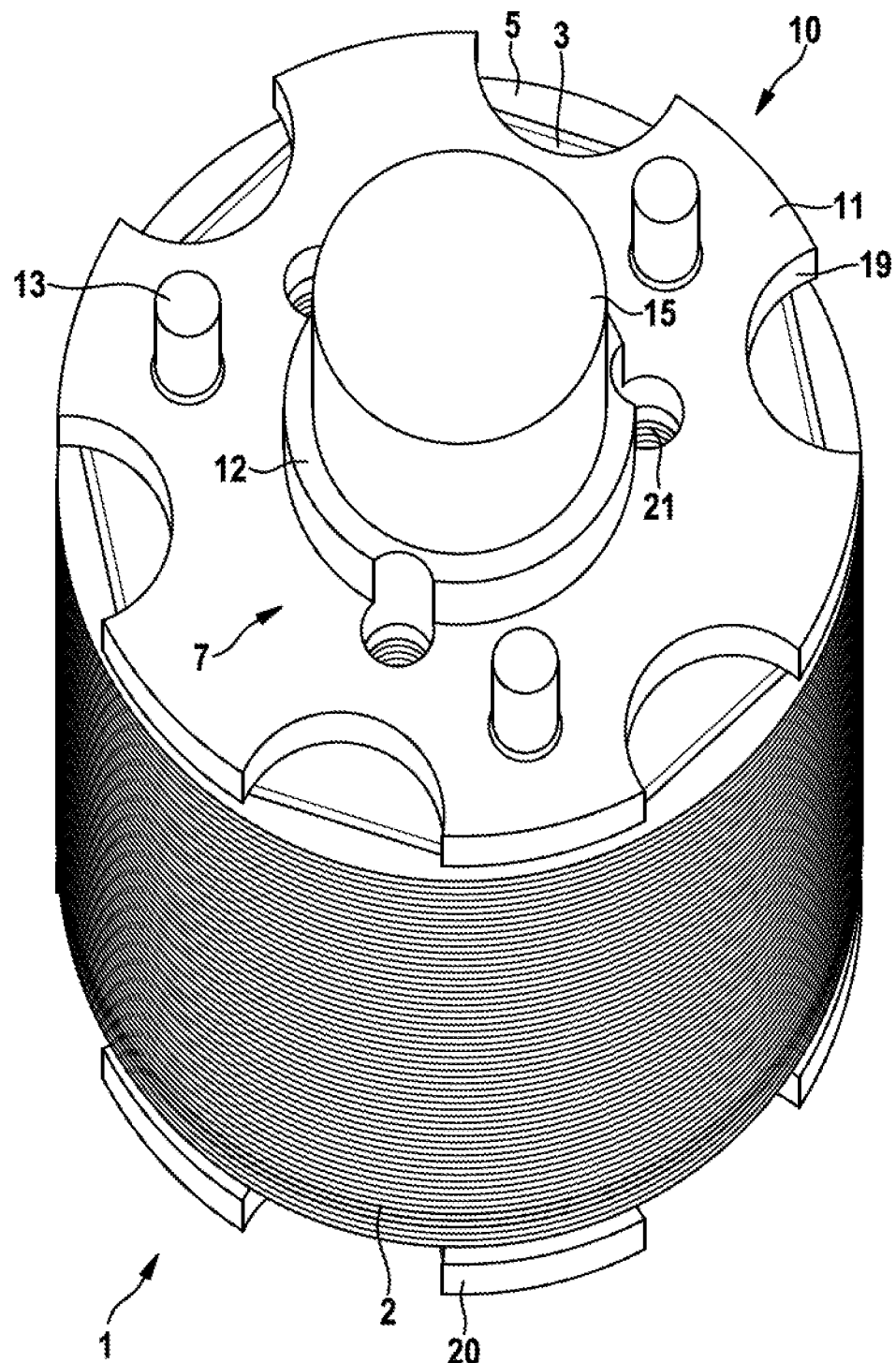
FIG. 3 is the rotor device of FIG. 2 with magnet wheel centering means and magnet wheel alignment means.

FIG. 3 shows the rotor device 1 of FIG. 2 with an additionally molded-on magnet wheel centering means in the form of an insulating ring 12 and a magnet wheel alignment means in the form of three pin elements 13. The pins 13 have the shape of bolts or cylinders and are arranged concentrically about the rotor axis mutually offset at an angle of 120°. The lower cover element 20 has a toothed edge that is congruent with the edge 10 of the upper cover element 7.

Figure 4:
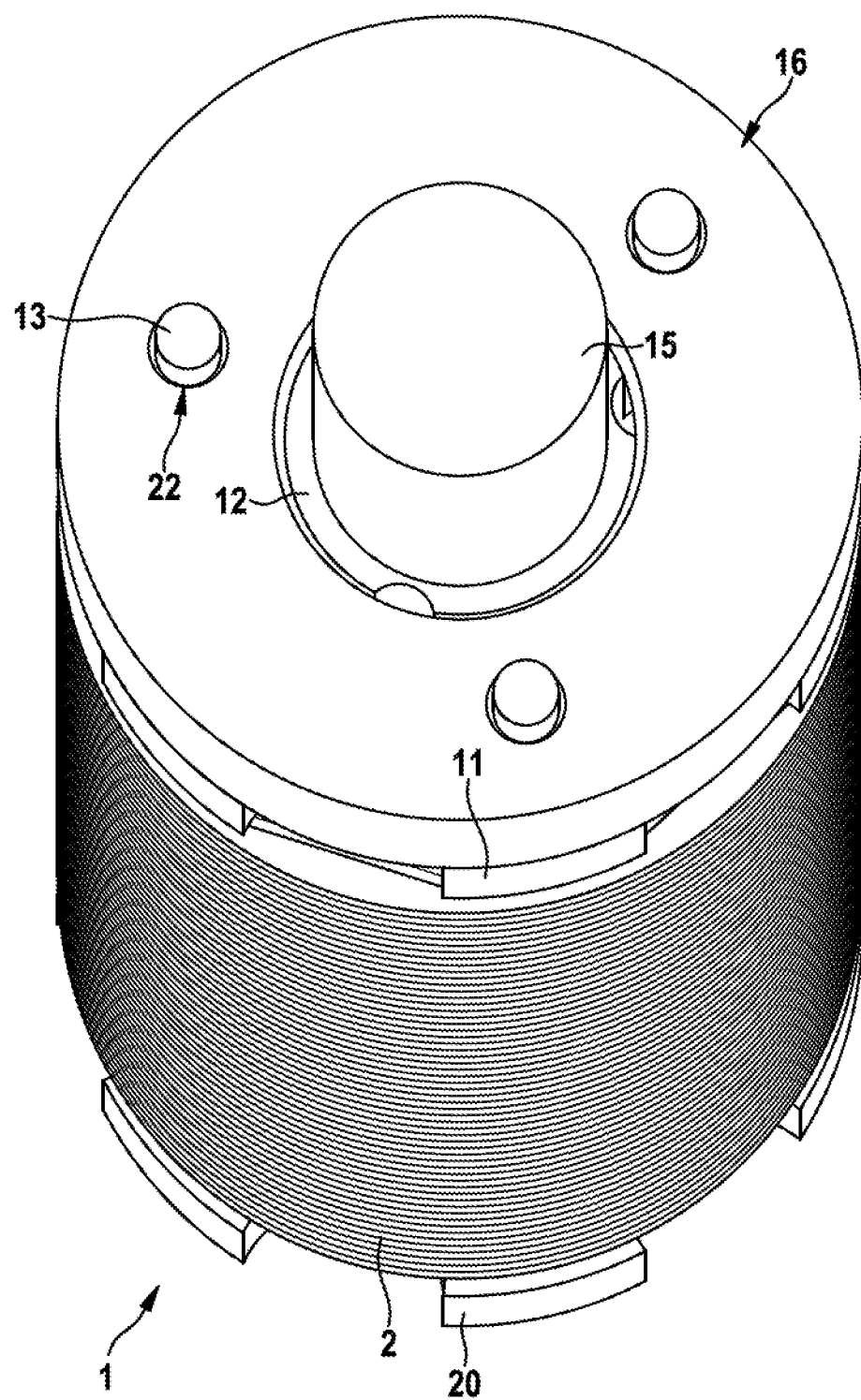
FIG. 4 is a rotor with the rotor device according to the invention from FIG. 3.

FIG. 4 shows the rotor device 1 of FIG. 3 with a round magnet wheel 16 placed on it, in particular as rotor 14 according to the invention. The magnet wheel 16 has the shape of a disk or ring and the same diameter as the rotor body 2. The magnet wheel additionally has a hole or cut-out which is formed in the center of the magnet wheel and into which the rotor shaft 15 is inserted with the insulating ring 12 in order to center the magnet wheel. In the magnet wheel, three holes 22 are moreover formed, into which all three pin elements 13 are inserted in order to align the magnet wheel.

Figure 5A:
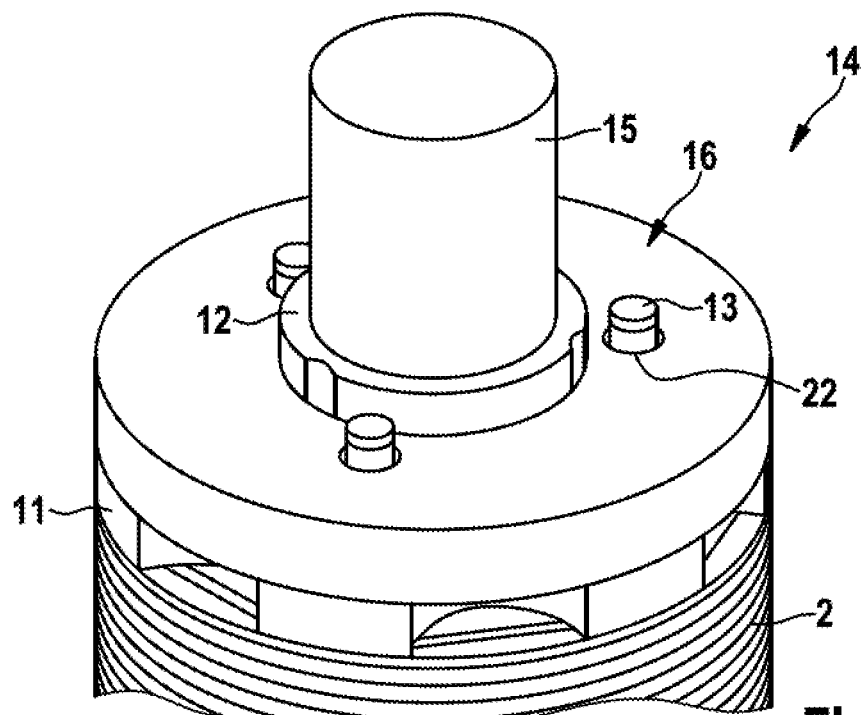
FIG. 5a is another perspective view of the rotor of FIG. 4.

FIG. 5a shows another perspective view of the rotor 14 of FIG. 4. The insulating ring 12 and the pin elements 13 have a height that is greater than the thickness of the magnet wheel 16.

Figure 5B:
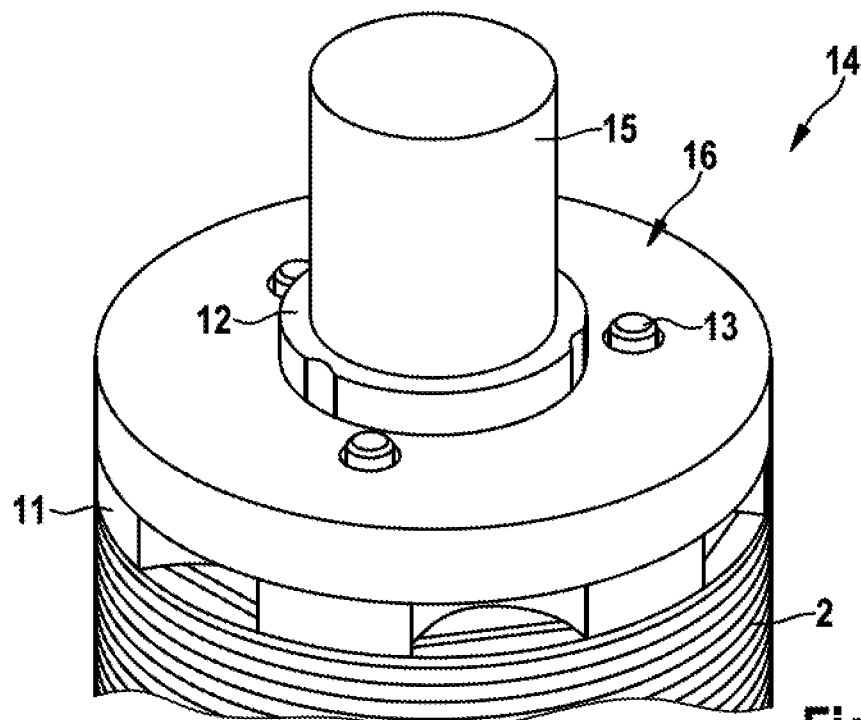
FIG. 5b is the rotor of FIG. 5a, with a magnet wheel placed and mounted on it.

FIG. 5b shows the rotor 14 of FIG. 5a, wherein the magnet wheel that is placed on it is mounted by reshaped pin elements 13. The reshaping of the pin elements 13 is carried out by ultrasonic welding or hot pressing. In the process, the pin elements 13 lose their original height and, similarly to a rivet, form a head that mounts the magnet wheel 16 to the rotor device, in particular to the cover element 7 (not completely visible).

Figure 6:
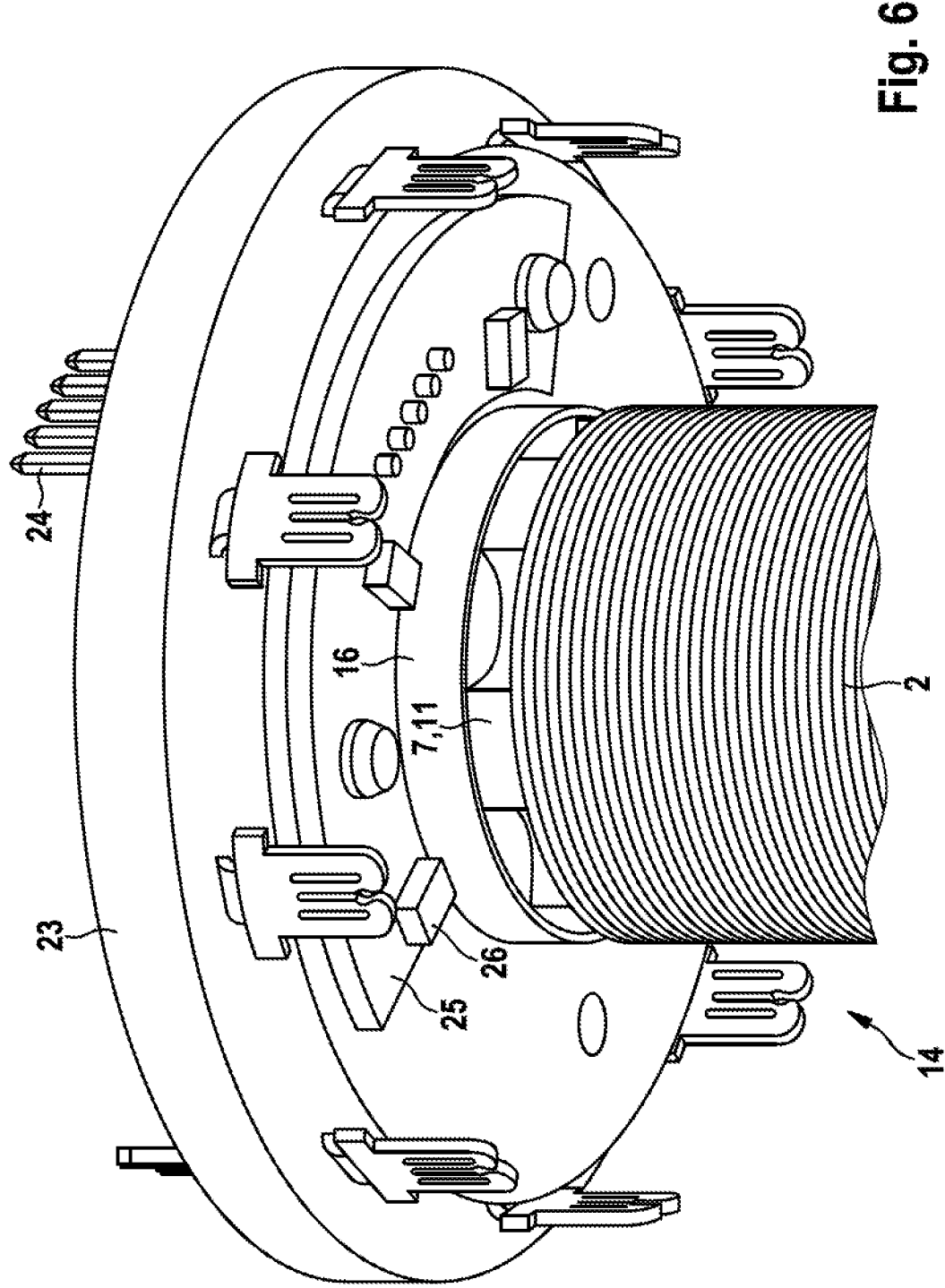
FIG. 6 is an arrangement of a rotor of FIG. 5b in a rotor bearing holder, in particular in a circuit board with Hall sensors.

FIG. 6 shows an arrangement of a rotor 14 of FIG. 5b in a rotor bearing holder 23, in particular in a circuit board or an electronic measurement system 25 with Hall sensors 26. The rotor 14 is rotatably mounted in the holder 23. On the upper side of the holder 23, electrical connectors 24 are arranged in order to receive one or more control signals and to send one or more measurement signals. On the bottom end face of the holder 23, the circuit board 25 is formed as a ring segment and arranged around the magnet wheel 16. The three Hall sensors 26 are arranged at a 60° angle to each other concentrically about the rotor axis. The twelve electrical contacts 30 arranged concentrically on the edge of the bottom end face of the holder 23 serve to supply current to the electric coils of the stator described below.

FIG. 7 shows a cross-section of a BLDC electric motor with the arrangement of FIG. 6 and a stator 27. The stator is mounted on the holder 23 and comprises a certain number of coils, which generate a magnetic or rotating field in order to cause the rotor 14, in particular the rotor device, to rotate. The rotor 14, in particular the rotor shaft 15, is mounted rotatably on the holder 23 by means of a ball bearing 28, wherein the ball bearing comprises a plurality of balls 29. The injected plastic molding compound, which forms the cover element 7 among other things, extends into a hole of the rotor body 2, and is lacking in the opposite hole 18, as can be seen well. The magnet wheel 16 is located at a distance from the holder 23 in order to prevent friction.

Figure 8A:
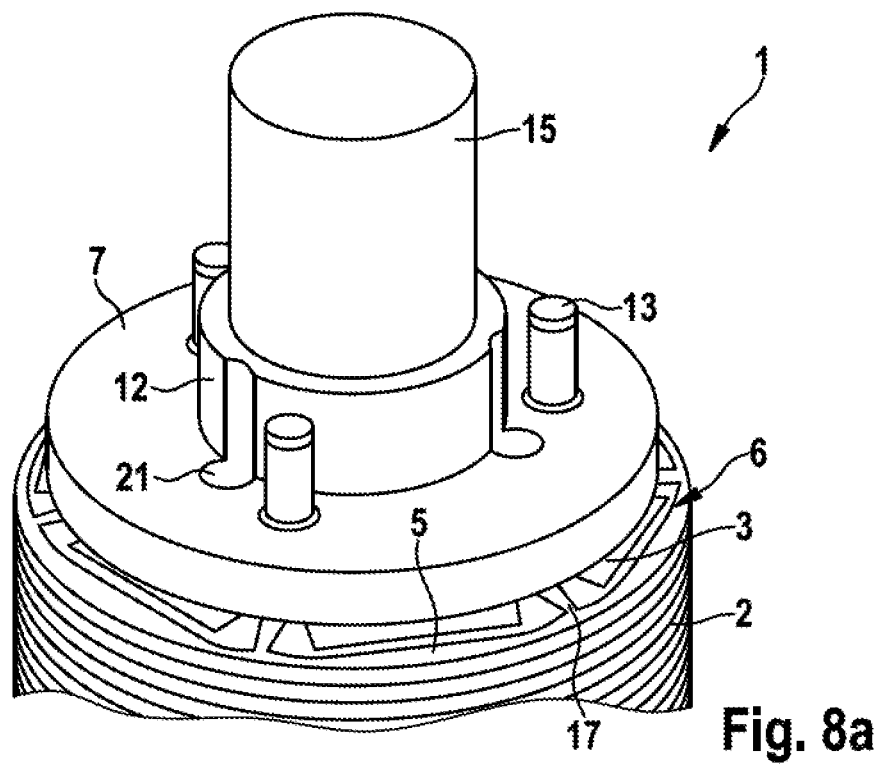
FIG. 8a is a rotor device according to the invention according to a preferred exemplary embodiment with a rotor shaft and a circular design of cover element.

FIG. 8a shows a rotor device 1 according to the invention with a rotor shaft 15 and a cover element 7 of circular design, which is designed without a toothed edge in comparison to the cover element of FIG. 2. Otherwise, the cover elements 7 of FIG. 8a and FIG. 2 are identical. The plastic molding compound 6 which is injected into the magnet receptacles 5 and arranged between each wall 17 and each magnet 3 can be seen well. In this case, the plastic molding compound 6 is formed integrally with the cover element 7. The diameter of the cover element 7 is designed such that the magnets 3 are partially covered.

Figure 8B:
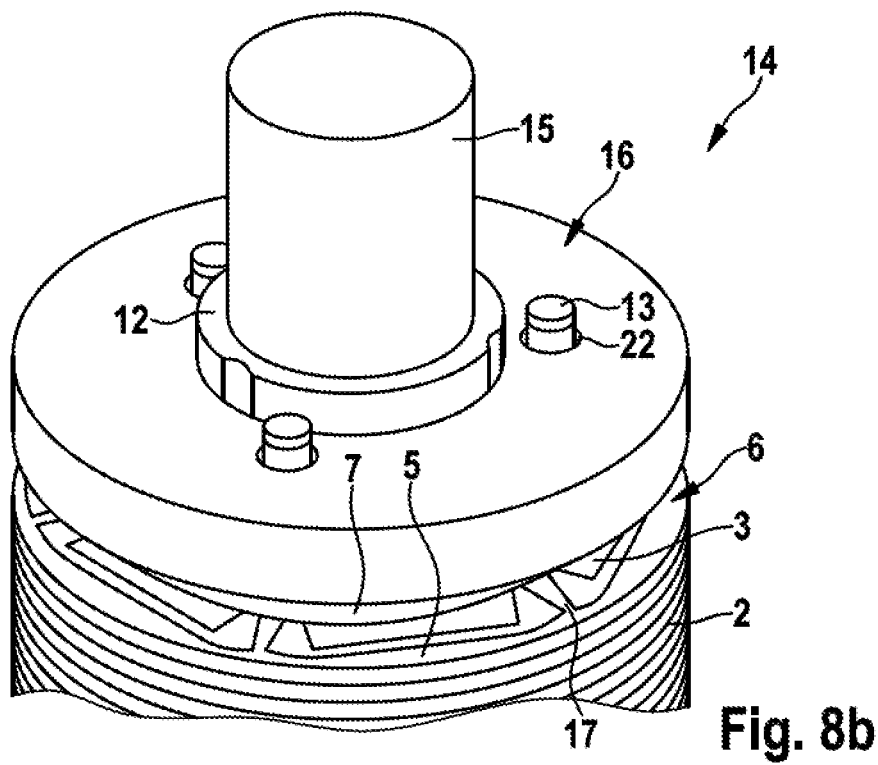
FIG. 8b is the rotor device of FIG. 8a with a magnet wheel placed on it.

FIG. 8b shows the rotor device 14 of FIG. 8a with a magnet wheel 16 placed on it, wherein the pin elements 13 of the cover element 7 are inserted into the holes 22 in the magnet wheel 16 but have not yet been reshaped.

Figure 9A:
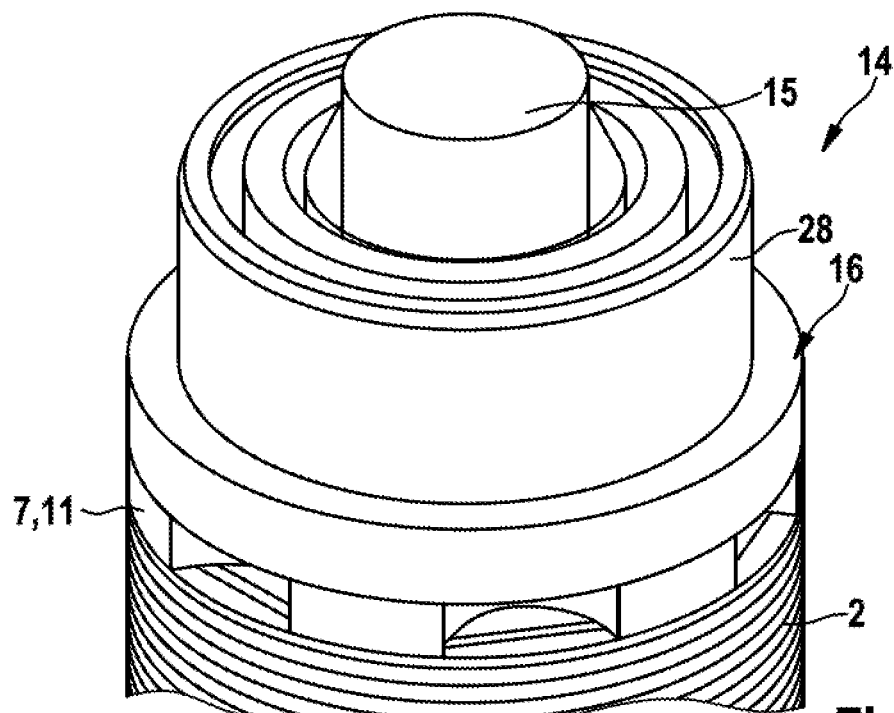
FIG. 9a is a rotor according to the invention according to a preferred exemplary embodiment with a ball bearing placed on it.

FIG. 9a shows a rotor 14 according to the invention according to FIG. 5b with a ball bearing 28 placed on the rotor shaft 15. The diameter of the ball bearing 28 is smaller than the diameter of the magnet wheel 16 or of the rotor body 2.

Figure 9B:
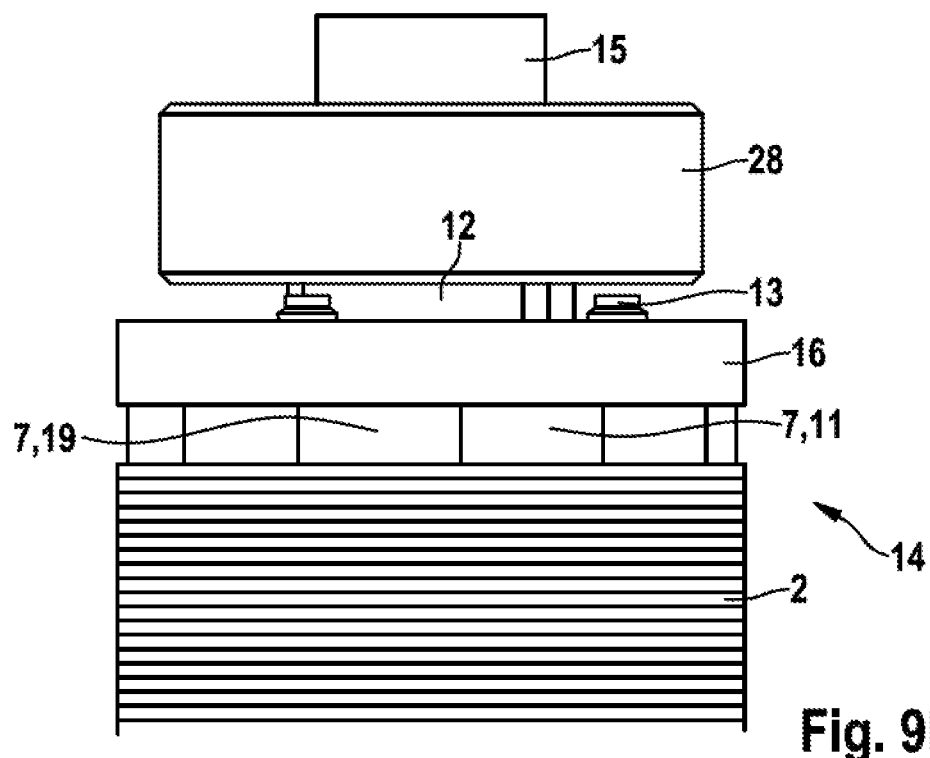

FIG. 9b shows a side view of the rotor 14 of FIG. 9a. The pin elements 13, which were reshaped as soon as the ball bearing 28 was placed onto the shaft 15, can be seen well. The ball bearing 28 is moreover located at a distance from the magnet wheel 16 in order to allow the rotor device to rotate freely.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Rotor device
2 Rotor body
3 Magnet
4 Rotor shaft seat (of the rotor body)
5 Magnet receptacle (of the rotor body)
6 Plastic molding compound
7 Cover element
8 Opening (of the magnet receptacle)
9 Hole (in the cover element)
10 Toothed edge (of the cover element)
11 Tooth (of the toothed edge)
12 Insulating ring (as magnet wheel centering means)
13 Pin element (as magnet wheel alignment means)
14 Rotor
15 Rotor shaft
16 Magnet wheel
17 Wall (of the magnet receptacle)
18 Hole (in the rotor body)
19 Indentation/recess (of the toothed edge)
20 Additional cover element
21 Hole (in the cover element)
22 Hole (in the magnet wheel)
23 Rotor bearing holder
24 Electrical connectors (of the rotor bearing holder)
25 Electronic measuring system
26 Hall sensor
27 Stator
28 Ball bearing
29 Ball (of the ball bearing)
30 Electrical contact

What is claimed is:

1. A method for producing a rotor device, the method comprising the steps of:
   a) providing a rotor body having a cylindrically shaped edge, the rotor body having a rotor shaft seat and a plurality of magnet receptacles each having an opening arranged coaxially with the rotor shaft seat near the cylindrically shaped edge;
   b) inserting magnets into the magnet receptacles;
   c) injecting a plastic molding compound into the magnet receptacles for rigidly mounting the magnets, the same plastic molding compound forming at least one disk-shaped cover element having a peripheral edge, the disk-shaped cover element covering the openings of the magnet receptacles at least partially and extending to the edge of the rotor body; and
   d) providing a magnet wheel to the rotor device, such that the disk-shaped cover element is sandwiched between the magnet wheel and the rotor body,
   wherein the same plastic molding compound also forms on the disk-shaped cover element at least one magnet wheel centering structure in the form of an insulating ring and at least one magnet wheel alignment structure in the form of at least one pin element,
   wherein the rotor body is configured to be in direct contact with a rotor shaft, without the plastic molding compound interposing the rotor body and the rotor shaft at positions corresponding to the plurality of magnets,
   wherein the plastic molding compound of the insulating ring and the disk-shaped cover element is configured to be in direct contact with the rotor shaft, and
   wherein the magnet wheel has a perimeter edge that extends to the edge of the rotor body similarly to the peripheral edge of the disk-shaped cover element such that the disk-shaped cover element is sandwiched between the magnet wheel and the rotor body out to the peripheral edge of the disk-shaped cover element.

2. The method according to claim 1, further comprising the step of positioning the magnet wheel on the magnet wheel centering structure so as to directly contact the magnet wheel centering structure.

3. The method according to claim 2, wherein the magnet wheel is connected to the magnet wheel centering structure and/or the magnet wheel alignment structure by ultrasonic welding, hot pressing, and/or gluing.

4. The method according to claim 2, wherein the magnet wheel is directly injected onto the disk-shaped cover element by means of a two-component injection-molding process.

5. The method according to claim 1, wherein the molding compound is a liquid-crystal polymer.

6. The method according to claim 1, further comprising the step of positioning the magnet wheel on the magnet wheel alignment structure.

7. The method according to claim 1, wherein the disk-shaped cover element covering the openings of the magnet receptacles only partially.

8. The method according to claim 7, wherein the peripheral edge of the disk-shaped cover element includes alternating indentations and teeth.

9. The method according to claim 8, wherein the teeth are located above intermediate walls between the magnet receptacles.

10. The method according to claim 9, wherein the teeth extend to the edge of the rotor body.

11. The method according to claim 10, wherein the indentations are formed such that a part of a top end face of a respective magnet within a respective magnet receptacle is visible.

12. The method according to claim 11, wherein the indentations are formed in the shape of semicircles between adjacent teeth.

13. A method for producing a rotor device, the method comprising the steps of:
   a) providing a rotor body having a cylindrically shaped edge, the rotor body having a rotor shaft seat and a plurality of magnet receptacles each having an opening arranged coaxially with the rotor shaft seat near the cylindrically shaped edge;
   b) inserting magnets into the magnet receptacles;
   c) injecting a plastic molding compound into the magnet receptacles for rigidly mounting the magnets, the same plastic molding compound forming at least one disk-shaped cover element having a peripheral edge, the disk-shaped cover element covering the openings of the magnet receptacles at least partially and extending to the edge of the rotor body; and
   d) providing a magnet wheel to the rotor device, such that the disk-shaped cover element is sandwiched between the magnet wheel and the rotor body,
   wherein the same plastic molding compound also forms on the disk-shaped cover element at least one magnet wheel centering structure in the form of an insulating ring and at least one magnet wheel alignment structure in the form of at least one pin element,
   wherein the rotor body is configured to be in direct contact with a rotor shaft, without the plastic molding compound interposing the rotor body and the rotor shaft at positions corresponding to the plurality of magnets,
   wherein the plastic molding compound of the insulating ring and the disk-shaped cover element is configured to be in direct contact with the rotor shaft,
   wherein the disk-shaped cover element covering the openings of the magnet receptacles only partially,
   wherein the peripheral edge of the disk-shaped cover element includes alternating indentations and teeth,
   wherein the teeth are located above intermediate walls between the magnet receptacles,
   wherein the teeth extend to the edge of the rotor body,
   wherein the indentations are formed such that a part of a top end face of a respective magnet within a respective magnet receptacle is visible, and
   wherein the indentations are formed in the shape of semicircles between adjacent teeth.

* * * * *